United States Patent

[11] 3,601,919

[72] Inventors Billie B. Nixon
2601 Virginia Ave, Fort Smith, Ark. 72901;
Adrian B. Mooney, Fort Smith, Ark.;
Charles A. Bradley, 1702 N. 52nd St., Fort Smith, Ark. 72901
[21] Appl. No. 836,787
[22] Filed June 26, 1969
[45] Patented Aug. 31, 1971
[73] Assignee said Nixon and said Bradley, by said Mooney

[54] FISHING ROD AND REEL HOLDER FOR BOAT AND LAND FISHING
2 Claims, 6 Drawing Figs.
[52] U.S. Cl. .................................................. 43/21.2,
248/42, 248/291
[51] Int. Cl. .................................................. A01k 97/10

[50] Field of Search............................................ 248/38, 39,
40, 41, 42, 44; 43/21.2

[56] References Cited
UNITED STATES PATENTS
2,454,458 11/1948 Kaetker........................ 248/42
2,787,431 4/1957 Smith........................... 248/42

Primary Examiner—William H. Schultz
Attorneys—A Yates Dowell and A. Yates Dowell, Jr.

ABSTRACT: A holder for a fishing rod and reel anchorable in the earth or on a boat, with a bracket which can rotate about a vertical axis for direction and about a horizontal axis for angularity, and with a socket for receiving the butt end of the pole and spaced brackets adjustably mounted for supporting the pole, for preventing its rotation while supported, and for engagement with the reel to prevent pull on the line from releasing it, and with such bracket also including means for attachment of a fish stringer.

PATENTED AUG 31 1971 3,601,919

INVENTORS
BILLIE B. NIXON,
ADRIAN B. MOONEY &
CHARLES A. BRADLEY

BY
ATTORNEYS

FISHING ROD AND REEL HOLDER FOR BOAT AND LAND FISHING

BACKGROUND OF THE INVENTION

1. Field of the Invention

The invention is in the field of supports used by fishermen and designed to be used on land or on a boat for holding a pole during fishing without the necessity for the fisherman being in constant attention, and making it possible for the fisherman to use more than one rod and to apply himself to whatever he chooses while he is fishing.

2. Description of the Prior Art

Many types of devices have been employed for mounting a fishing rod, but these have been subject to criticism as being ineffectual or not satisfactorily performing the functions for which they were designed, or they were too costly or complicated both in construction and use, and if they held the rod solidly, did not permit instant release.

SUMMARY OF THE INVENTION AND OBJECTS

The invention includes a mounting unit in the form of an inverted U-shaped bracket with a clamping screw by which it may be fastened on a boat or fastened on the upper end of a detachable earth-piercing stake when used on land. On this U-shaped bracket is a second bracket having right angular portions, one adapted to be disposed horizontally and rotatable about a screw pivot for directional position and with an upright arm on which is pivoted an elongated fishing rod support and an adjusting arm forming with the upright arm and the supporting arm a triangle with one side of adjustable length. The adjusting arm has a slot and a knob with a screw extending therethrough for adjusting the angularity of such elongated support.

The elongated support has a socket member for receiving the butt end portion of the rod and a pair of upwardly opening yokes adjustable lengthwise on the elongated support in spaced relation to said socket member to allow the rod to lie therein by gravity but adjustably along the same, one of which upwardly opening yokes forms a stop for the reel on the fishing rod and consequently the rod to which it is attached so that pulling of the rod by the line will not detach the rod from the holder but will allow the rod to be readily gripped and lifted from the holder by only one hand.

It is an object of the invention to provide a practical, simple, relatively inexpensive fishing rod and reel holder which can be fabricated from readily accessible metal stock and thereafter used with great advantage and satisfaction.

Another object of the invention is to provide a rod and reel holder which will effectively retain the rod in any desired directional position and at any desired angularity and without the attention of the fisherman, as well as a device which is of sturdy construction and will last indefinitely.

DESCRIPTION OF THE PREFERRED EMBODIMENT

Figure 1:
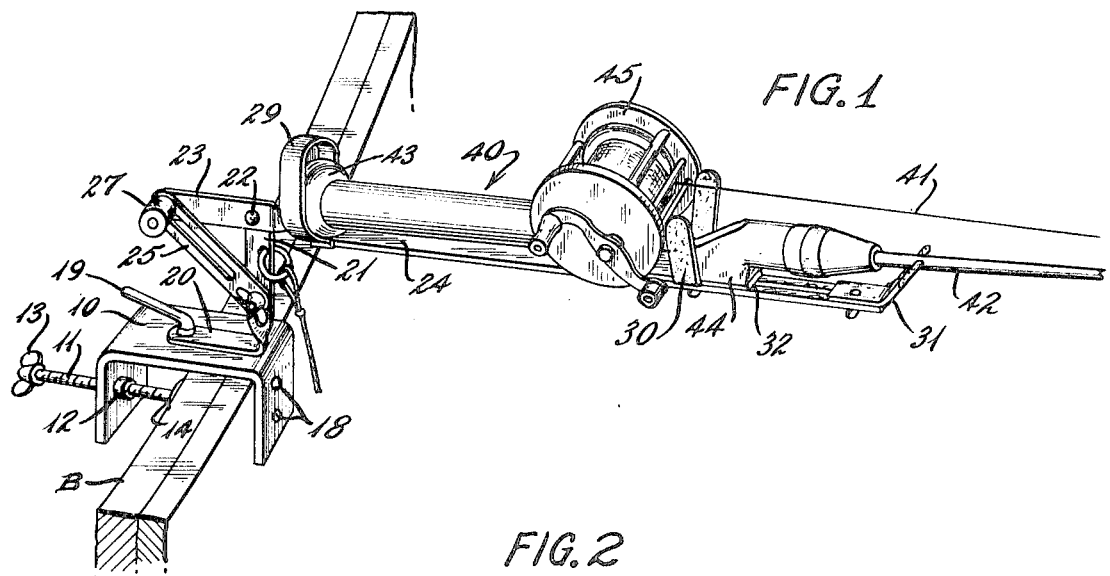
FIG. 1 is a perspective illustrating one application of the invention.
Figure 2:
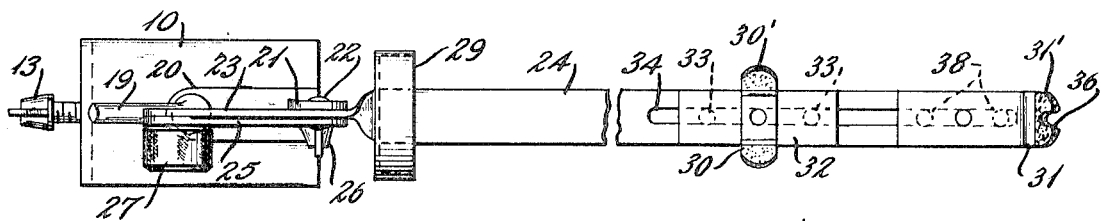
FIG. 2, a top plan view of the holder itself.
Figure 3:
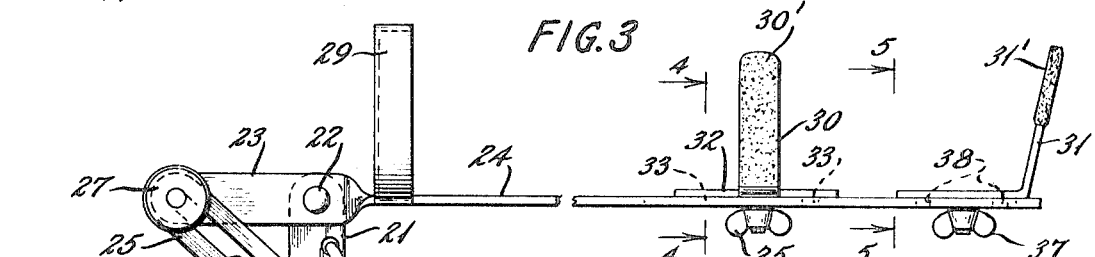
FIG. 3, a side elevation thereof.
Figures 4, 5:
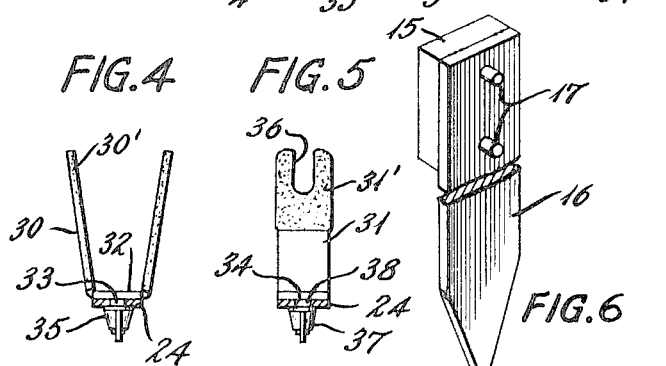
FIG. 4, a section on the line 4—4 of FIG. 3.
FIG. 5, a section on the line 5—5 of FIG. 3.
Figure 6:
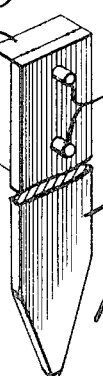
FIG. 6, an enlarged fragmentary perspective of a stake to which the device can be attached.

In accordance with the present invention, a mounting unit is provided including an inverted U-shaped base bracket 10 with a clamping screw 11 extending through an opening 12 in one of the legs of the U. This clamping screw has a wing-type head 13 at its outer end for manual manipulation and a clamp head 14 at its opposite end by which it may be fastened on a portion of a boat B, or on the upper end portion 15 of a detachable earth-piercing stake 16, the upper end of such stake having a pair of bosses or spaced projections 17 which fit into spaced recesses 18 in the leg of the U-shaped clamp 10.

Rotatably mounted on the base bracket 10 by means of a screw clamp 19 is a second bracket having right angular portions 20 and 21, the portion 20 being horizontally disposed and rotatable about the screw clamp 19 for directional position and with the upright arm 21 twisted 90° from the horizontal portion 20. On this upright arm 21 is mounted by means of a pivot 22 an elongated fishing rod and reel support having a rear end portion 23 in a plane substantially at right angles to its forward much longer portion 24 on which the rod and reel are directly mounted. The rear portion 23 can move slightly about the pivot 22 subject to an adjusting arm 25 forming with the upright arm 21 and the generally horizontal rear portion of the elongated fishing rod support, a triangle.

In order to provide for the adjustment of the supporting arm, has one end attached by a wingnut and screw 26 to the upright arm 21 and has its opposite end connected by a knob and screw 27 to the rear end portion 23, the screw portion of the knob 27 being located in a slot 28 of the adjusting arm 25. Thus when the wing screw 26 and knurled knob and screw 27 are loosened, the knob can be moved along the slot 28 to lower the rear end of the rod and reel supporting arm and raise the front end of the same and thus move the rod and reel accordingly.

In order to mount the rod handle portion 40 of the rod 42 and reel 45 solidly against the pull of the fish line 41, but for instant release when gripped in the hand, the elongated support 24 is provided adjacent its rear end with a socket member 29 for receiving the butt portion 43 of the rod and a pair of upwardly opening yokes 30 and 31, at the front end so that all that is necessary to mount the rod and reel is to align the rod with the support, then insert the butt end 43 of the rod in the socket member 29 and lower the rod until it rests between the upwardly opening yokes 30 and 31 in which position the upwardly directed and outwardly divergent arms 30' of the yoke 30 will engage frictionally the vertically disposed walls of the offset portion 44 of the rod in such a manner that rotation of the rod will be prevented although the rod remains in position only by the action of gravity. It will be understood that the angular relationship of the arms 30' of the yoke 30 will accommodate frictionally rod handles of varying widths.

The upwardly open yoke 30 is mounted on a base member 32 having projecting means of any desired character such as projections 33 which slide in a slot 34 and is held in place by a wingnut and screw 35 which permit adjustment of the upwardly open yoke 30 toward the socket member 20 sufficient to engate the reel 45 on the rod and prevent forward movement of the rod and reel relative to its support sufficiently to permit the butt end of the rod to become free from the socket 29. Thus only raising movement of the rod will free it from the holder.

The upwardly open yoke 31 has a notch 36 in which the rod can rest, and in order to have it located in the proper longitudinal position on the support 24 it is provided with a bolt and wingnut 37. The bracket also is provided with projecting means such as spaced projections 38 which ride in the slot 34. Thus the yoke 31 may be secured in the desired adjusted position longitudinally of the support 24.

From the foregoing it will be readily apparent that the fishing rod and reel holder of the present invention may be clamped onto a portion of a boat or may be attached to a stake when used on land. After being secured in place on the boat or on land, the butt end of the fishing rod is inserted in the socket 29 and the rod allowed to rest between the arms of the yoke 30 and the notch 36 of the yoke member 31, and the yoke members 30 and 31 are adjusted appropriately to compensate for variations in rod and reel dimensions. Thereafter the direction and angularity of the support 20 may be readily made by the direction screw clamp 19 and the loosening of the fixed nut 26 and the knurled rotary head 27 and the latter slid lengthwise of the slot 28.

Further, it will be readily understood that when the fishing rod and reel are thus mounted, it will be held solidly against dislodgement caused by pull on the line while allowing the gripping of the rod in the hand and the immediate disengagement of the same from its holding support. The second bracket with the right angular portions 20 and 21 can rotate 360°, thus allowing the rod to be swung from a fishing position to a position in the opposite direction. Also, the upwardly opening yokes 30 and 31 may be provided with protective surfaces which will not injure the rod as by dipping in a nonabrasive surface forming material such as rubber or plastic 31′.

We claim:

1. In combination with a fishing rod and reel, a mounting and holding device for selective attachment to a suitable support; said fishing rod including a handle having a butt portion, a reel mounting portion, and a portion having vertically disposed walls immediately forward of said reel mounting portion; an elongated rod and reel support releasably mounted on said holding device for both rotatable and angular horizontal adjustment, said rod and reel support being releasably mounted about a generally horizontal pivot for adjusting the angularity of a fishing rod and reel carried thereby; and means for attachment of said rod and reel to said elongated rod and reel support, said means comprising a socket for the butt end of said rod handle and at least one longitudinally upwardly opening yoke member mounted upon said support for longitudinal adjustment, said yoke member including a pair of diverging arm portions for engagement with the vertically disposed walls of the handle of the rod to prevent rotative movement of said rod, said yoke member being adjustable longitudinally of said support to permit the adjustment of said yoke member in abutting relationship with respect to said reel to prevent endwise movement of said rod and inadvertent disengagement of the butt portion of the handle from said socket.

2. A fishing rod and reel as set forth in claim 1 including a second adjustable upwardly opening yoke member spaced from said first-mentioned yoke member and located adjacent the free extremity of said support and providing a support for said rod at a point forward of the handle portion thereof.